United States Patent [19]
Nardino

[11] 3,959,821
[45] May 25, 1976

[54] SOUND RECORDING AND/OR REPRODUCING APPARATUS WITH MOVABLE CARRIAGE RECEIVING REMOVABLE TAPE CASSETTE

[75] Inventor: Righi Nardino, Milan, Italy
[73] Assignee: Elpro S.A., Mauren, Liechtenstein
[22] Filed: Aug. 6, 1974
[21] Appl. No.: 495,249

[52] U.S. Cl. .................................. 360/96; 360/105
[51] Int. Cl.² ................... G11B 15/18; G11B 5/54; G11B 21/22
[58] Field of Search .............. 360/96, 105; 242/198, 242/199

[56] References Cited
UNITED STATES PATENTS

| | | | |
|---|---|---|---|
| 3,578,261 | 5/1971 | Yamamoto | 360/96 |
| 3,669,456 | 6/1972 | Oteki | 360/96 |
| 3,729,202 | 4/1973 | Wakabayashi | 360/105 |
| 3,843,847 | 10/1974 | Sato | 360/105 |

FOREIGN PATENTS OR APPLICATIONS

| | | | |
|---|---|---|---|
| 47-5313 | 2/1972 | Japan | 360/96 |

*Primary Examiner*—Robert S. Tupper
*Attorney, Agent, or Firm*—Flynn & Frishauf

[57] ABSTRACT

A cassette-type tape recorder device comprising a movable carriage into which a tape cassette is removably engageable to be operatively received in the apparatus. The apparatus has a support frame with guiding means along which the carriage is linearly slideable in the longitudinal direction of the apparatus to locate the cassette in a received operative position in the apparatus, the carriage being slideable such that the active length of the magnetic tape in a cassette is caused to move parallel to the direction of displacement of the carriage along the guide means.

Tape dragging means are carried by a vertically movable supporting plate which is located beneath the carriage. Guiding means are provided for retaining the supporting plate and for displacing the supporting plate mainly in the vertical direction while always maintaining the supporting plate substantially parallel to the bottom of the carriage, thereby insuring proper engagement of the tape dragging means with the bobbins of the cassette.

21 Claims, 8 Drawing Figures

SOUND RECORDING AND/OR REPRODUCING APPARATUS WITH MOVABLE CARRIAGE RECEIVING REMOVABLE TAPE CASSETTE

This invention relates to an apparatus for recording and/or reproducing sounds by means of a magnetic tape wound onto a pair of bobbins, housed in a small cassette insertable into a panel of the apparatus.

BRIEF DESCRIPTION OF THE DRAWINGS

The invention will be now explained in the following description, wherein reference is made to the annexed drawings showing, by way of example, a preferred embodiment of the apparatus of the present invention, of the type that can be mounted in the housing of the usual tool panel of a traditional motor vehicle.

In the drawings.

DETAILED DESCRIPTION

Figure 1:
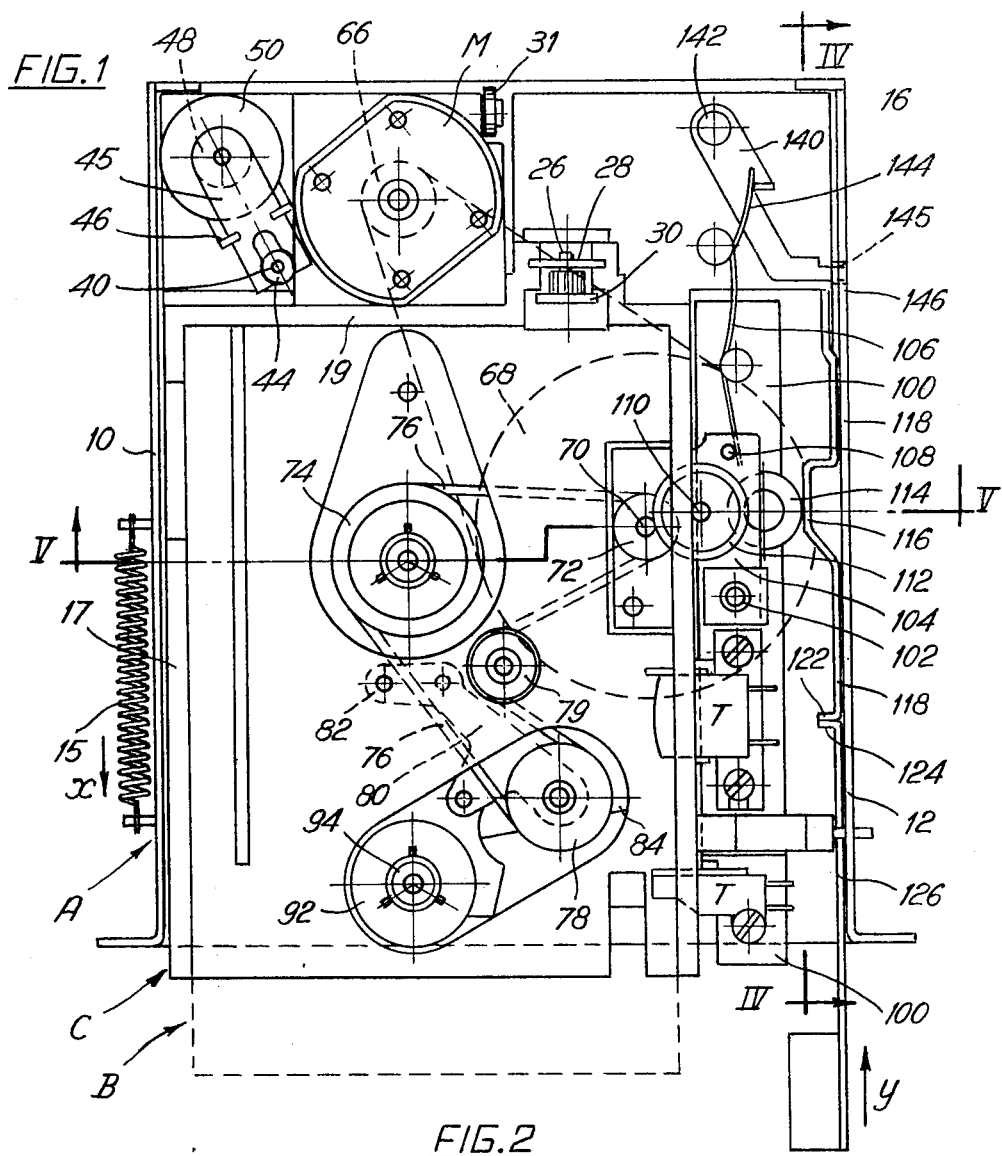
FIG. 1 is a top view of the apparatus of the present invention, with the tape cassette inserted and with the corresponding recording-and-reproducing members in engagement with the tape.

The apparatus illustrated in the drawings is comprehensive of a box-shaped guiding and supporting frame A, said frame being open at the top, as well at the rear and front walls thereof, whereas the front side of said frame is closed, in the known manner, by means of a plate or a screen, said plate or screen being provided with a gauged square opening through which a tape box or cassette B (hereinafter referred to as "cassette") is introduced, said cassette housing, in the known manner, two bobbins with parallel axes, to wind and unwind the magnetic tape with an alternate motion.

According to the present invention, cassette B shows, lengthwise to the longitudinal sides thereof (that is, at the right side according to FIGS. 1 and 2), guiding members for the straight length of the tape which unwinds in parallel with the longitudinal axis of said cassette, as will be explained below.

Cassette B is advantageously retained by a housing of a carriage C, said carriage being slidable along guides provided in the longitudinal walls 10 and 12 of guiding frame A.

In other words, the wall at the left side in FIG. 1 showing carriage C, is provided with one or more pivots 14, said pivots engaging matching slits provided in wall 10.

In the illustrated case, one of the above mentioned pivots retains a return spring 15, to displace carriage C in the direction of arrow X in FIG. 1, that is to such a position as to expel cassette B from the seat provided in carriage C.

At wall 12, carriage C is guided by means of twin rolls 16 (FIG. 3) retained by said wall, while listels arranged lengthwise to said carriage, are slidable between said rolls.

Carriage C has, below the left longitudinal wall 16 thereof, supports 18 (FIG. 2) for a pivot 20, the axis of said pivot 20 being parallel with the longitudinal axis and to the displacement direction of said carriage.

Pivot 20 provides the fulcrum for a pair of levers 22–23 (see FIGS. 2, 5 and 6), the arms whereof of which extend transversely to carriage C and below a supporting plate C1 associated with said carriage. Plate C1 provides a movable support for a number of members of the apparatus of the present invention, as described in the following, said plate C1 being movable in the vertical direction, in such a way as to be, at any time, maintained parallel with the bottom of carriage C which is situated above the plate C1.

The unengaged ends of levers 22–23 are hinged to the above mentioned movable plate C1 by means of pivots 24 and 25, to guide said plate in parallel with the bottom of carriage C. In other words, plate C1 performs only one resultant motion, said resultant motion being the result of two component motions, one of which being a vertical and the other a horizontal motion, the latter component of said resultant motion being minor relative to the first and being performed from the left to the right (FIG. 1), in order to insure that the various parts of the cassette and of the apparatus are kinematically coupled to each other.

Figure 2:
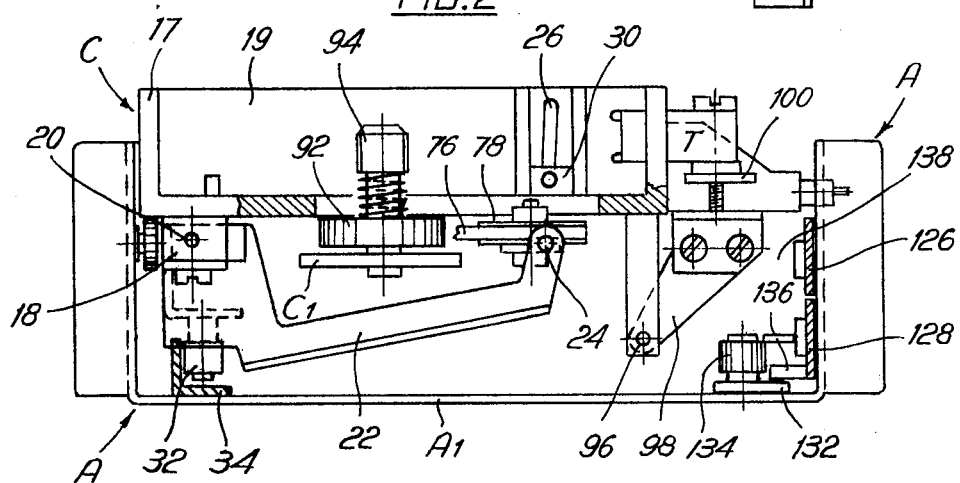
FIGS. 2 and 3 respectively show, in elevation, the front and rear end views of the apparatus of FIG. 1.
Figure 3:
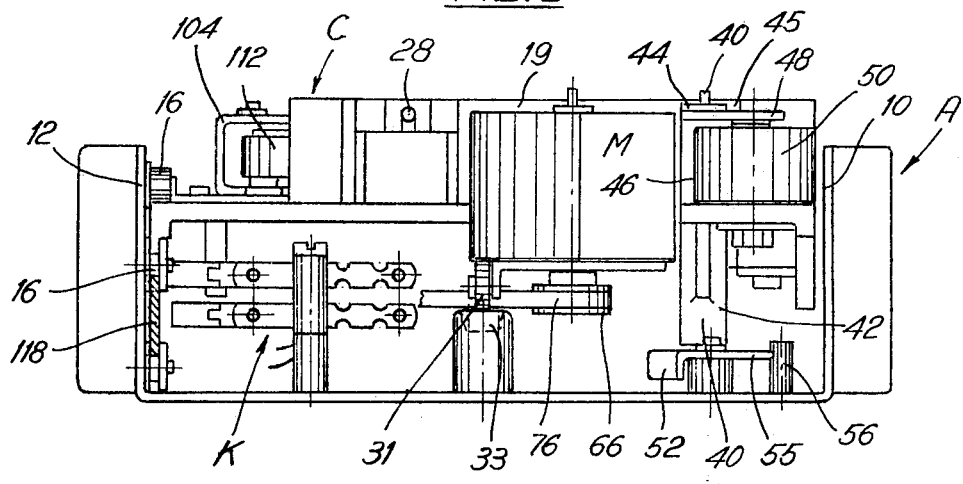
Figure 5:
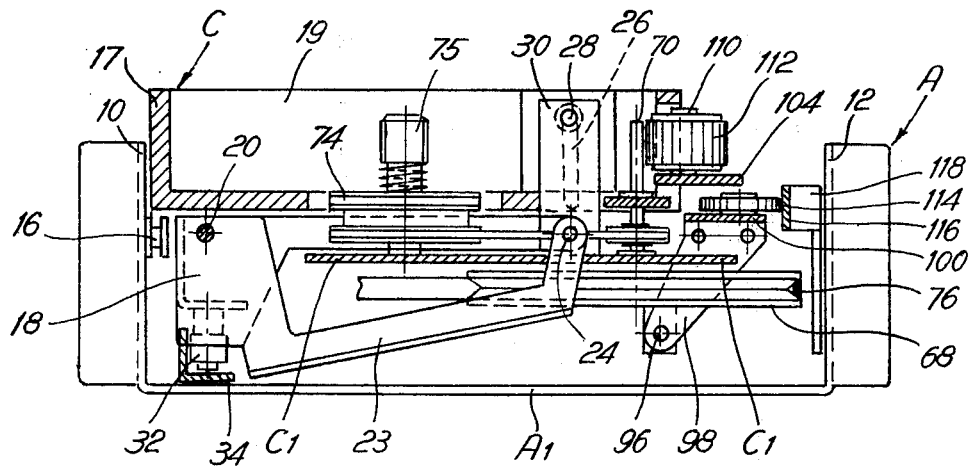
Figure 6:
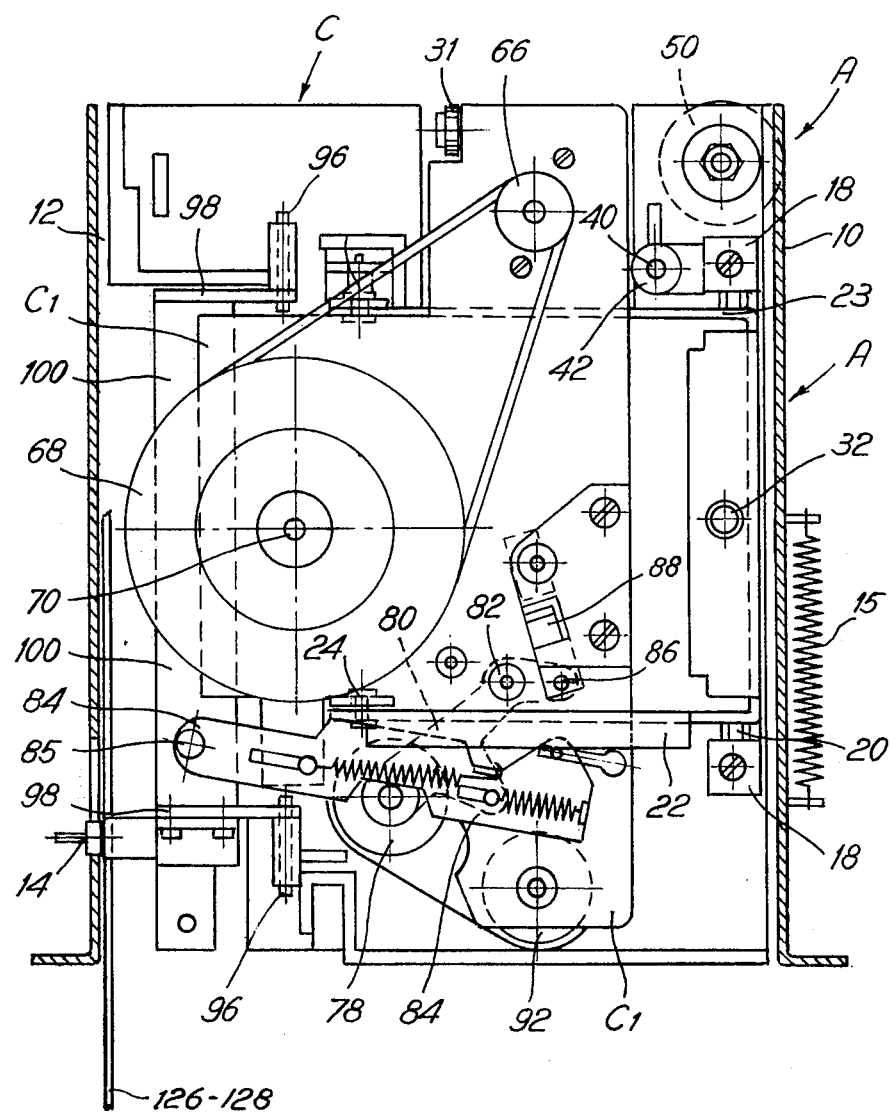
FIG. 6 shows the apparatus of FIG. 1 viewed from below and in upward direction, with the guiding and supporting frame cut away.

Guiding carriage C firmly retains, at the rear wall 19 thereof, a small plate, having, at the longitudinal side thereof, one inclined slit 26 (see FIGS. 2, 3 and 5). A pin 28 fixed to a square wing 30 integral with movable plate C1, engages said slit 26, in order to supervise the desired displacemnt of the plate concerned.

To insure the vertical displacement of movable plate C1 in parallel with the bottom of carriage C, said plate is provided with supplemental guiding members (see FIGS. 3, 6 and 7), the guiding members comprising a sliding roll 31 which cooperates with an inclined surface 33. The above mentioned parts are inserted into the bottom wall of guide frame A and secured to said frame, as well as to movable plate C1.

It can be easily understood that, when shaping inclined surface 33, it is possible to impart a final displacement having the desired features, to movable plate C1.

Figure 7:
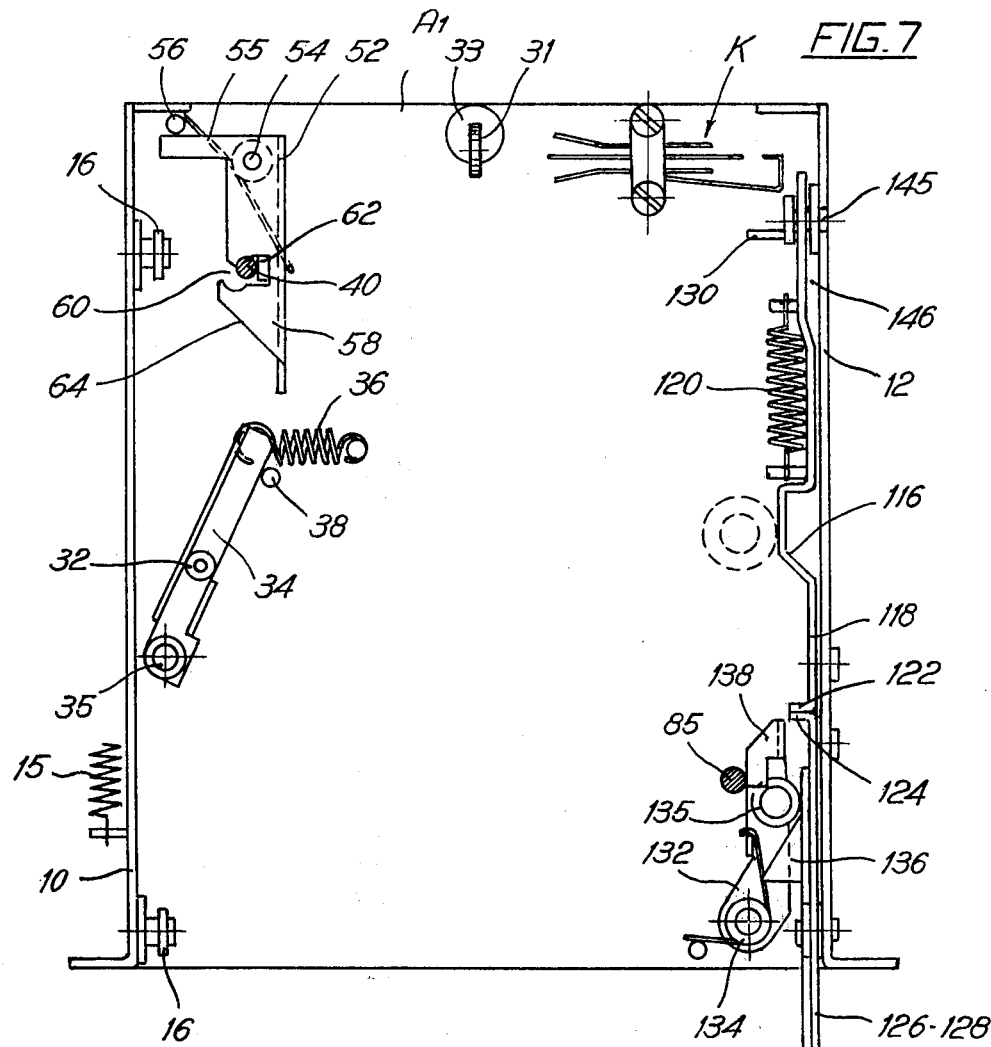
FIG. 7 is a plan view of the guiding frame, with the carriage removed.

Twin levers 22–23 have, at the fulcrum 20, a vertical rod to retain a small roll 32 that cooperates with a cam-shaped member secured to guiding frame A and oriented along the above mentioned direction, comprised of, as seen in FIG. 7, a guide rail 34 hinged, by means of pivot 35, to the bottom wall of said frame A. One spring 36 is anchored to guide rail 35 and said spring maintains said rail 34 in its working position, against a stop 38, in such a way that said spring provides a safety member against such unusual efforts as are encountered by carriage C during the displacement thereof, while, on the other hand, when the carriage moves in a direction opposite to arrow X (see FIG. 1), roll 32, when it encounters the rear profile of guide rail 34, causes twin levers 22–23 to swing in a counter-clockwise direction (FIG. 2), so as to lift movable plate C1, together with the members retained by said plate, while said lifting motion is controlled by the characteristic shape of the above described guide-slit 26.

Carriage C together with plate C1, are retained in a recessed or working position against the action of spring 15, by means of appropriate latches, while said carriage has, toward the rear part thereof, one pivot 40 slidably guided in a bush 42, vertically secured to said carriage C. The lower end of pivot 40 protrudes from the above mentioned bush, while the upper end of said pivot is in engagement with a tube 44 having peripheral notches, in order to engage the fork-shaped end of lever 45 fulcrumed to a square piece 46 secured to carriage C. The other end of lever 45 retains a disc 48 made of a magnetic material, to form the keeper of an electro-magnet, the core of which, together with winding 50, are retained by the unengaged end of square piece 46. It follows that, when said electro-magnet is excited, it attracts keeper 48, in order to lift pin 40 against the action of the corresponding spring means, so as to disengage said pin from the latch.

Base plate A1 of guiding frame A retains, next to the lower end of springed pivot 40, one square-shaped lever 52, the fulcrum 54 of said lever forming part of said base-plate A1, said lever retaining a spring 55 which causes said lever to rotate in a clockwise direction, in order to maintain said lever 52 in engagement against a stop 56 (FIG. 7).

Figure 8:
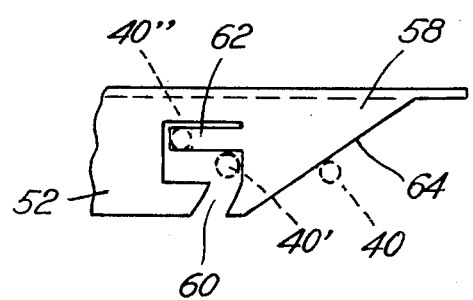
FIG. 8 is a close-up, in enlarged scale, of FIG. 7.

One of the arms 58 of square lever 52 is provided with a restrained window 60 (shown in FIGS. 7 and 8) forming a spiked tooth, to engage the lower end of the above mentioned pivot 40. The edge of the restrained window 60 opposite to the opening of said window, has an inclined wing 62, the lower end of said wing 62 being situated beneath the lower end of the pivot 40; or otherwise, at a par level with said pivot, while the upper end of said pivot is coplanar with the upper face of arm 58 of lever 52, that is, said plane or level rises toward arrow X.

Arm 58 of lever 52 ends, at the end thereof, with an inclined surface 64 which meets and engages the pivot 40, secured to said carriage, during the motion of carriage C. The displacement of carriage C in a direction opposite to arrow X and in contrast with the action performed by spring 15, causes the pivot 40 to engage the inclined surface 64, thus causing lever 52 (in FIG. 7) to swing in an counter-clockwise direction and said swinging motion continues, until said pivot 40 is flush with the opening of window 60. When said position has been reached, lever 52 is caused to swing in the clockwise direction, under the action performed by spring 55, into engagement with window 60, as shown at 40' of FIG. 8.

In such a way, pivot 40' engages the longitudinal edge of the inclined wing 62. As a consequence, carriage C is retained in its recessed position, owing to the fact that pivot 40 is engaged in window 60. When the springed pivot 40 is uncoupled frmm restrained window 60, carriage C is set free, in order to recede under the influence of spring 15 and said disengagement is performed by urging said carriage toward arrow X, in such a way that the lower end of the pivot 40 engages the rear edge of the above mentioned window 60, the low end of said wing 62 being flush with the above mentioned rear edge, thus engaging said wing with the end of the pivot 40. Consequently, the action performed by spring 15 recalls carriage C in the direction of arrow X, while the inclined plane or surface of wing 62 causes pivot 40 to lift, thus disengaging said pivot from the restrained window 60, whereafter said carriage returns to its initial position, protruding from the front end of the apparatus.

A like result is attained, when the electro-magnet 50 is excited. In this case, keeper 48 is attracted and disengages pin 40 from the restrained window 60, to permit a backward motion of carriage C.

Movable plate C1 retains, at the rear side thereof, an electric motor M equipped with a strap pulley 66, which actuates a wheel-pulley 68, keyed to a vertical shaft 70, together with an intermediate pulley 72. The last mentioned pulley is operatively connected with another pulley 74, provided with a friction clutch of the type known in the art, said friction clutch being designed to actuate dragging pivot 75, which can be brought in engagement with a matching hub of one of the winding bobbins housed in cassette B.

The support for the small vertical shaft 70 is shown by the movable plate C1 and the upper end of said shaft extends, over a certain length, in an upward direction, in order to co-operate with the back of the tape contained in cassette B, as will be explained in the following. Owing to the fact that plate C1 is movable, when carriage C is in an inactive position, the upper end of vertical shaft 70 is in a lowered position and it substantially coincides with the bottom wall of said carriage.

When the carriage is shifted to the working position, that is in a direction oppposite to that of arrow X, small shaft 70 is lifted and threaded into openings provided in the walls of the cassette, to be disposed in correspondence with the back of the tape.

Strap 76 to connect pulleys 72 and 74 to one another, engages as well a counterpulley 78, retained by a lever 80, the fulcrum 82 of which is provided by movable plate C1. Lever 80 connects with a springed slider 84, which is retained by the lower face of movable plate C1, said slider ending, at one of the ends thereof, with a driving roll 85, for the purposes as set forth in the following.

Slider 84 is operatively connected, by means of a pin 86, with a complementary slider 88 (see FIG. 6) exerting an action on the friction member of pulley 74 of the dragging pivot 75, in order to disconnect the kinematic connection between said pivot and motor M. Slider 84 is maintained in the position shown in FIG. 6, by means of spring means 90 and, when said slider is operated, it causes arm 80 to swing, in order to bring strap 76 of pulley 78 in engagement with the periphery of a pulley 93 keyed to dragging pivot 94 torsionally connected with the hub of the other one of the two pulleys contained in cassette B.

In the neighborhood of dragging shaft 70, carriage C has, at the lower side thereof, pivots 96 (FIGS. 2, 5 and 6), retaining swinging arms 98 connected to one another by means of a traverse 100, said traverse being parallel with the longitudinal axis of the carriage. Traverse 100 provides a supprt for the small magnetic recording, erasing and reproducing heads T. Furthermore, a pivot 102 and a swinging arm 104 are fulcrumed to the aforementioned traverse, said arm being biased by spring 106 which causes said arm to swing in a counter-clockwise direction, in order to engage a pin 108 with stops which match those that said traverse is provided with. Arm 104 retains, at the unengaged end thereof, one vertical pivot 110 for a friction wheel 112 provided with an elastically yielding coating. When carriage C is in its working or recessed position, friction wheel 112 adheres the tape of cassette B by pressure against vertical shaft 70 and the rotational motion of said shaft drags said tape along with a constant speed.

Figure 4:
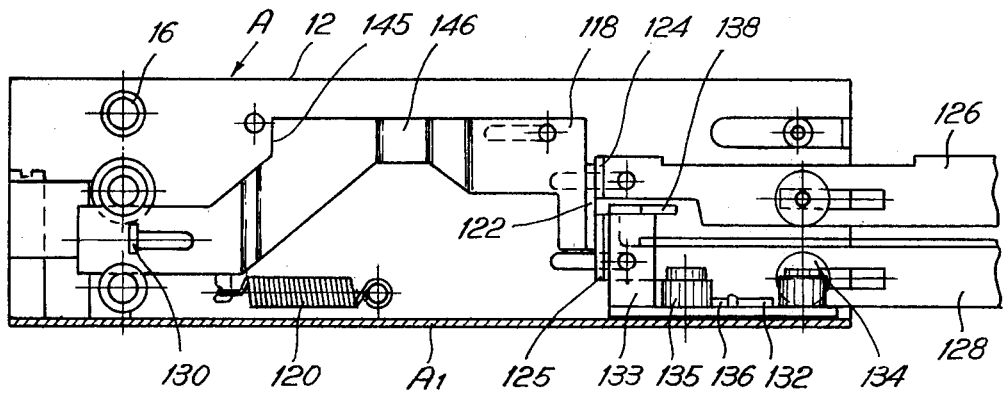
FIGS. 4 and 5 are respective sections taken along lines IV—IV and V—V of FIG. 1.

One roller 114 is secured to traverse 100 beneath wheel 112, said roller engaging a cam 116 of a slider 118 (FIGS. 1, 4 and 5), slidably retained to wall 12 of frame A.

Slider 118 is biased by spring means 120, designed to displace said slider in the direction of arrow X, in order to engage the square-shaped end 122 of the slider concerned, with corresponding, aligned ends 124 and 125 of two rods 126 and 128, said rods being superimposed and slidably retained by the side wall 12 of frame A.

Suitable rods 126 and 128 terminate, at the ends thereof, with control buttons (not shown), to cause small frame 96-98-100 to swing in a clockwise direction (FIG. 2). Springed slider 118 terminates, at the other end thereof, with a square appendix 130 that exerts an action on one of the elements of a group of electric commutators, K designed to supervise the electric circuits of the apparatus; another of said commutators is actuated by the displacement of carriage C.

Slidable rod 128 actuates as well one springed lever 132, the fulcruming pivot 134 thereof being secured to bottom wall A1 of frame A, said lever having one roll 135, to co-operate with a shaped wing 136 (FIGS. 4 and 5) integral with sliding rod 128. Lever 132 is provided with a small square wing 138, the end whereof is cam-shaped to cooperate with a driving roll 85 shown by the above described slider 84.

The rear end of carriage C is provided with a small pawl 140 (FIG. 1), which is aligned with traverse 100. Pawl 140 is hinged by means of a pivot 142 and biased by spring means 144, the action of which tends to rotate said pawl in a clockwise direction, to adhere it, by pressure, against wall 12 of guiding frame A.

When carriage C is in its protruding or resting position, pawl 140 engages its end into an opening 145 provided in wall 12 and said pawl comes into engagement with projection 146 of slider 118, so as to cause said projection to block both of slidable rods 126 and 128. On the other hand, when the carriage is moved to its rear position or working position, said carriage causes the disengagement of pawl 140 from opening 145, in such a way that the end of said pawl is moved away from projection 146 of slider 118, thus permitting the actuation of slidable rods 126 and 128.

I claim:

1. Apparatus for sound recording and/or reproducing on magnetic tape contained in a cassette having two bobbins around which the magnetic tape is wound, comprising:
    a movable carriage (C) for receiving a tape cassette;
    a supporting frame (A) having guide means only allowing movement of said carriage linearly and horizontally between a loading position and an operative position to locate a cassette in said apparatus, such that the longitudinal axis of the active length of the magnetic tape in a cassette in the carriage is moved parallel to the direction of displacement of the carriage along said guide means;
    a vertically movable supporting plate (C1) beneath said carriage;
    guiding means (22,23 and 31,33) retaining said supporting plate and only allowing movement of said supporting plate substantially in the vertical direction between inoperative and operative positions while always maintaining said supporting plate substantially parallel to the bottom of said carriage;
    tape dragging means (75,94) coupled to said supporting plate for engaging a bobbin of a received cassette when said carriage and said supporting plate are in their operative positions;
    drive means including a motor for driving the other of said bobbins of a received cassette;
    recording and/or reproducing means including at least one recording and/or reproducing head for engaging the tape in a received cassette;
    said carriage including means to actuate said tape dragging means and said drive means, and for bringing the at least one head into engagement with said magnetic tape, responsive to said carriage being moved to its operative position in said frame whereby said casssette is operatively received therein;
    commutable clutch means (74,78-92) for operatively connecting said tape dragging means with the drive motor;
    a swinging frame (96,98,100) and means hinging said swinging frame to said carriage (C) about a swinging axis substantially parallel with the direction of displacement of said carriage and therefore with the longitudinal axis of the active length of the tape contained in a received cassette, said swinging frame supporting at least said at least one head, said hinging means providing pivotal movement of said swinging frame between an operative position in which said at least one heat engages the tape of a received cassette and an inoperative position spaced from a received cassette;
    spring latch means (40,42) provided between said carriage (C) and said supporting frame (A), to retain said carriage in its operative position or inoperative position; and
    two driving means, the first of which (32, 34) is coupled to selectively lift and lower said supporting plate and the second of which 114,116) is coupled to cause said swinging frame to swing about its swinging axis, both driving means acting responsive to the displacement of the carriage along said guide means whereby when said carriage is in its operative position said support plate and said swinging frame are in their operative positions.

2. Apparatus according to claim 1, wherein said carriage (C) has, at the bottom thereof: at least two levers (22,23) pivotally mounted with a common fulcrum (20), said levers being connected with the vertically movable supporting plate (C1); connecting means adjacent to the fulcrum (20) of said levers for connecting said levers to each other, said connecting means including an arm (32) with a guide-rail (34) and a pivot (35) hinging said guide-rail to the bottom wall (A1) of said frame (A) which retains and guides said carriage, stop means (38) on the bottom of said carriage biasing spring means (36) coupled to said guide rail and biasing said guide-rail against said stop means such that the longitudinal axis of said rail is inclined with respect to the direction of displacement of said carriage (C) along said guiding means.

3. Apparatus according to claim 2, comprising complementary guide members (26,28,30) coupled between said vertically movable supporting plate (C1) and said carriage (C), said complementary guide members (26,28,30) providing, during the displacement of said carriage, for a vertical as well as a horizontal displacement of said supporting plate, the horizontal displacement of said supporting plate being substantially less than, and being minor in relation to, the vertical displacement.

4. Apparatus according to claim 1, comprising complementary guide members (26,28,30) coupled between said vertically movable supporting plate (C1) and said carriage (C), said complementary guide members (26,28,30) providing, during the displacement of said carriage, for a vertical as well as a horizontal displacement of said supporting plate, the horizontal displacement of said supporting plate being substantially less than, and being minor in relation to, the vertical displacement.

5. Apparatus according to claim 4, wherein said vertically movable supporting plate (C1) is provided, at one of the tranversal ends thereof, with at least one square-shaped appendix (30), and including a pivot (26) retained by said at least one square-shaped appendix and a guiding slit (28) formed in the mating wall of the carriage for engaging said pivot (26) therein, in order to impart to the members retained by said supporting plate, together with the displacement of the swinging frame (96,98, 100), a resultant motion consisting of two component motions, one of which is vertical and the other horizontal.

6. Apparatus according to claim 1, comprising supplemental guiding members (31,33) coupled between said vertically movable supporting plate (C1) and said frame (A) for positioning said supporting plate at a given height, said supplemental guiding members comprising an inclined surface extending lengthwise to said direction of displacement of said carriage.

7. Apparatus according to claim 1 wherein:
said spring latch means for said carriage (C) comprises one springed arm (52) and a pivot (54) pivotally connecting said springed arm to the bottom wall (A1) of said supporting frame (A), said springed arm having, toward one of its ends, a plurality of cam-like surfaces (60,62,64), the active surface of one of said cam-like surfaces (62) being orthogonal to the others of said cam-like surfaces (60,64) which are coplanar one with the other, and wherein a pivot pin )40) is provided in the carriage, to cooperate, in a predetermined succession, with said plurality of cam-like surfaces, said pivot pin (40) being relatively movable lengthwise to the axis thereof with respect to said cam-like surfaces; and
spring means (15) is provided for urging said carriage to its inoperative position;
said carriage being normally retained in its operative position due to the engagement of said pivot pin (40) with one of the cam-like surfaces (60), while the further displacement of the carriage against the action of said spring means (15), engages said pivot pin (40) with the cam-like surface (62) which is orthogonal to the preceding cam-like surface in order to engage the end of said pivot pin (40) and to provide for the relative mutual displacement between said springed arm (52) and said pivot pin (40), to disengage said pivot pin (40) from said plurality of cam-like surfaces and to allow the return motion of the carriage to its inoperative position.

8. Apparatus according to claim 7, further comprising an electromagnet (50) having a keeper (48) which is operatively connected with said pivot pin (40) of said spring latch means to disengage said pivot pin (40) from the cam-like surfaces (60,62,64) of said spring arm (52) when said electromagnet is excited.

9. Apparatus according to claim 7, including a spring biased bush (44) in which said pivot pin (40) of said spring latch means is slideably retained, said bush being secured to the carriage and biased by spring means to cause said pivot pin (40) to engage said cam-like surfaces (60,62, 64) of said swinging arm (52) pivoted to the back wall (A1) of said supporting frame (A) for the carriage.

10. Apparatus according to claim 9, further comprising an electromagnet (50) having a keeper (48) which is operatively connected with said pivot pin (40) of said spring latch means to disengage said pivot pin (40) from the cam-like surfaces (60,62,64) of said spring arm (52) when said electromagnet is excited.

11. Apparatus according to claim 1, wherein said supporting frame (A) includes interrupting means (K) for interrupting the supply of electrical power to at least one of the motor (M) and the circuits for the at least one head, and said carriage (C) includes means (130) for actuating said interrupting means (K).

12. Apparatus according to claim 1, wherein said swinging frame (96,98,100) is disposed lengthwise to one of the longitudinal sides of the carriage (C); and including a cam means (116) on one of the side walls (12) of said supporting frame (A) which is engageable with said swinging frame such that the relative displacement of the carriage with respect to said supporting frame (A) causes said swinging frame to swing in a vertical plane which is substantially orthogonal to direction of displacement of the carriage.

13. Apparatus according to claim 12, comprising a plurality of sliding rods (126,128) carried by said carriage and operatively coupled to actuate said commutable clutch means (74,78,92,78) to in turn actuate said tape dragging means for the bobbins.

14. Apparatus according to claim 12, further comprising a supporting traverse (110) supported by said swinging frame; two arms (98); and pivots (96) hingedly connecting said two arms to the bottom of the carriage (C), said two arms being retained by the ends of said traverse such that the swinging axis of said swinging frame, as well as the longitudinal axis of the supporting traverse, are substantially parallel to the direction along which said carriage moves.

15. Apparatus according to claim 12 wherein said cam means (116) which causes said swinging frame (96,98,100) to perform a swinging motion, comprises: a spring biased springed slider (118) carrying said cam (116) and slideably retained by one of the walls (12) of said supporting frame (A); at least one slideable rod (126,128) provided with a matching control button cooperatively coupled with said spring biased slider (118) such that when said button is actuated said swinging frame (96,98,100) is also actuated to thereby also actuate said tape dragging means.

16. Apparatus according to claim 15 wherein said cam means (116) comprises two slideable rods (126,128) retained by one of the side walls (12) of said supporting frame (A), said rods being cooperatively coupled, at the ends thereof (124,125), with the front end (122) of said spring biased slider (118), to displace said cam (116) of said spring biased slider (118) to impart a swinging motion to the said swinging frame (96,98,100) via a roll (114) engaging said cam (116) to thereby move said swinging frame away from said carriage.

17. Apparatus according to claim 15, comprising a plurality of sliding rods (126,128) carried by said carriage and operatively coupled to actuate said commutable clutch means (74,78,92,78) to in turn actuate said tape dragging means for the bobbins.

18. Apparatus according to claim 15, further comprising a lever (132) connected to one (128) of said at least one slideable rod, said lever (132) being fulcrumed to the base plate (A1) of said supporting frame (A) and being provided with a further cam (138) thereon; and a further spring biased slider (84) coupled with said further cam; and a further lever (80) fulcrumed to the carriage and return pulley (178) retained by said further lever; said further cam actuating, via said further spring biased slider, said further lever and a friction clutch (74) coaxial with the tape dragging means associated with one of said bobbins of said cassette.

19. Apparatus according to claim 15, further comprising a supporting traverse (100) supported by said swinging frame; two arms (98); and pivots (96) hingedly connecting said two arms to the bottom of the carriage (C), said two arms being retained by the ends of said traverse such that the swinging axis of said swinging frame, as well as the longitudinal axis of the supporting traverse, are substantially parallel to the direction along which said carriage moves.

20. Apparatus according to claim 15, wherein said supporting frame (A) includes interrupting means (K) for interrupting the supply of electrical power to at least one of the motor (M) and the circuits for the at least one head, and said spring biased slider (118) includes means (130) for actuating said interrupting means (K).

21. Apparatus according to claim 15, including a spring biased locking lever (140) fulcrumed to carriage (C) adjacent the path followed by said spring biased slider (118); a stop (145) and a springed means (144) biasing said stop (145) in a given direction mounted to said supporting frame (A); said spring biased slider (118) engaging said biased stop (145) to lock said at least one sliding rod (126, 128) to prevent displacement of said at least one sliding rod when said carriage is in its inoperative position.

* * * * *